United States Patent Office 3,207,824
Patented Sept. 21, 1965

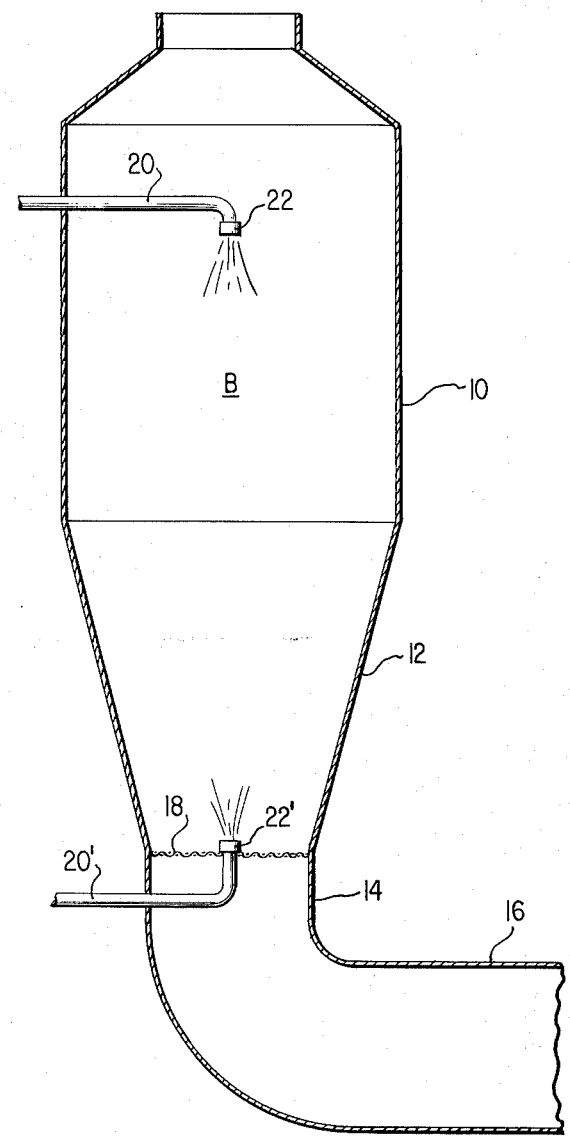

3,207,824
PROCESS FOR PREPARING AGGLOMERATES
Dale E. Wurster, Madison, Wis., Joseph V. Battista, Mountain Lakes, N.J., and James A. Lindlof, Madison, Wis., assignors to Wisconsin Alumni Research Foundation, Madison, Wis., a corporation of Wisconsin
Filed June 22, 1962, Ser. No. 204,454
5 Claims. (Cl. 264—117)

The present application is a continuation-in-part of copending application Serial No. 64,550, filed October 24, 1960 and now abandoned.

The present invention relates to an improved process of preparing agglomerates for use in various fields including the preparation of free flowing agglomerates adaptable for use as granules in the manufacture of compressed tablets.

Granule production has posed problems for years and an improved granulation process in which a gas suspended, fluidized bed of particles are coated with an atomized volatile liquid containing granulated materials both in solution and in suspension, is described in the copending application of Dale E. Wurster, Serial No. 810,128, filed April 30, 1959. The advantages of this coating process over the tedious, multiple step, conventional granulating process is also described in the Wurster application, supra.

For certain classes of products it is advantageous to produce agglomerates. For tablet granulations it is usually necessary to start with a mixture of finely divided powders and produce larger discrete particles of a size which will flow readily through hoppers, fill die cavities uniformly, and compress readily to form a firm, homogeneous tablet. A solution of binder material is used to adhere the fine particles into larger particles and it is then necessary to dry or remove the solvent used in the binder solution. The most efficient process would be one that requires the least solvent. An agglomeration technique, as differentiated from a coating technique, would normally require the addition and subsequent removal of less solvent.

Agglomerated particles are also of a softer, more bulky nature, forming tablets which are more soluble and easier to chew. Agglomerated particles, having a porous structure, have faster solubility than other types of particles and are useful then for products requiring fast solubility such as instantized drink products, gel-formers, etc.

The process of the present invention uses gas suspension as in the Wurster coating process, and agglomeration is performed by introducing liquid droplets, as opposed to finely atomized spray, of an adhesive binder solution into the fluidized bed of solid particles and then drying the resultant agglomerates. In the agglomeration process, it is essential that the liquid droplets be larger than the solid particles to be agglomerated.

The efficiency of the agglomeration mechanism is measured by the ratio of size of the agglomerated product to the size of the initial solid starting material. This will be a function of the size ratio of the liquid droplets and the starting solid particles, providing the bed of solid particles is fluidized and hence in constant circulation. If the solution or fluid is atomized into finely divided droplets so that liquid droplet size is small in comparison to solid particle size, the tendency is toward coating of the discrete solid particles with the binder solution as described in the Wurster application, supra. With the spraying of liquid droplets which are of large size in proportion to the powder particle size, the reverse occurs, and the liquid droplets become coated with solid particles. The binder will then diffuse out through the spaces between solid particles, wetting the outer surface which can then be covered with more dry particles resulting in a snowballing or agglomerating effect.

Liquid droplet size can be controlled by varying the concentration and hence, viscosity and surface tension of a solution and by varying the efficiency of the spraying nozzle or device. For example, to agglomerate finely divided powders of about 2 to 200 microns into 10–30 mesh particles, one can expel a saturated sucrose solution commonly called simple syrup through a commercially available spray nozzle normally designed for atomizing air pressures of 30 p.s.i.g. or over, but used for this process at low air pressures of only 10–12 p.s.i.g.

Another and a preferred example employs a 40–100 liquid nozzle, 0.040 inch I.D. (inner diameter)-0.100 inches O.D. (outer diameter) surrounded by a 180 air nozzle (0.180 inch I.D.) with air pressure of about 20–25 pounds per square inch. Also, as dilute solutions even in this large liquid nozzle tend to atomize finely and coat rather than agglomerate the small particles, the adhesive binder solutions used in the present invention are preferably relatively viscous solutions. Saturated sugar syrups containing, for example, about two parts of sucrose to one part of water are illustrative. In addition to producing droplets of the desired size, solutions of this type have the further advantage in that they require less solvent to be evaporated per weight of dissolved binder.

It is important to apply the spray droplets to a gas suspended bed of powder that is in continual circulation so that the agglomerates formed will be of a size controlled by the liquid droplet size. It was found that a fluidized bed is ideal for this application so that the formed agglomerates are transported away from the spray impingement region and replaced by a continuing supply of dry, unagglomerated powder. It is also helpful to deposit the droplets at or near the top of a fluidized bed so that one takes advantage of the inherent or natural classification which exists in such a bed, that is, the larger agglomerated particles will migrate from the upper agglomerating region and the small unagglomerated particles will migrate toward the region resulting in product size uniformity. It is also helpful if the liquid droplets pass through the air space above the fluidized bed, so that electrostatic attraction and impingement can remove finely divided dust from the escaping fluidizing air and reduce the carryover and dusting. In practice, however, it has been found that the droplets of adhesive binder can be introduced into any part of a continuously circulating fluidized bed. The droplets, for example, can be introduced at the bottom into the upwardly flowing fluidizing gas stream as illustrated in the drawing of the Wurster application, supra. The droplets can also be introduced simultaneously at different positions such as both at the top and at the bottom of the circulating fluidized bed.

Another consideration of importance is to apply the binder solution at a high rate so that there will be maximum wetting and binding of solid particles before drying increases the surface tension of the liquid and so that spray drying or case hardening of the liquid droplets is minimized.

The droplets sprayed on the circulating fluidized bed should be about as large or somewhat larger than the final size desired for the individual agglomerates. Droplets, for example about 600 microns will produce agglomerates about 30 mesh in size, droplets about 1000 microns will produce agglomerates about 18 mesh in size, droplets about 2000 microns will produce agglomerates about 10 mesh in size, etc. In all cases the fluidized solid particles should be in powder-type form around about 2 to 200 micron size.

For a more complete understanding of the practical application of the principles of the invention, reference is made to the appended drawing which shows an apparatus suitable for carrying out the process of the invention. In the drawing:

FIGURE 1 is a fragmentary cross-section of the apparatus.

Referring to FIGURE 1, the apparatus basically includes an agglomerating chamber 10, and a gas supply system and an agglomerating fluid material feed system. Illustrative gas supply and fluid material feed systems with conventional means for controlling humidity and gas temperature in the gas supply system, are shown in the copending Wurster application, supra.

Chamber 10 is a vertically elongated hollow shell, constructed of rigid hard material such as steel or aluminum, or a transparent synthetic resin (e.g., Lucite) or similar material or combinations of these or like materials. At its lower end chamber 10 includes a frustoconical lower end or throat section 12, reducing somewhat the diameter of the opening into chamber 10 at its lower end.

Depending from throat section 12, chamber 10 is provided with an elongated gas inlet section 14 which communicates at its upper end with the opening into section 12. The lower end of section 14 terminates in a conduit or duct section 16 into which the gas supply system (not shown) with its heat interchanger, etc., is connected. A grid or screen 18 is mounted at about the juncture of section 14 and throat section 12 extending completely across the opening. The screen has nothing to do with the agglomerating operation, but is preferably employed as a convenient means of preventing the particles to be agglomerated, prior to agglomeration, and the agglomerates, after agglomeration, from falling into the gas inlet section 14, i.e., before the flow of fluidizing gas is started and after the flow of gas is stopped.

The upper portion of chamber 10 (not shown) may be provided with a disengaging means of known design to facilitate disengagement of entrained fines. The upper portion of chamber 10 can also be provided with a conventional exhaust connection or fines or solvent recovery system.

The agglomerating fluid feed material system is arranged to introduce the agglomerating fluid, under suitable pressure through inlet connection 20 or 20' to spray head 22 or 22' or through both inlet connections 20 and 20' to spray heads 22 and 22'. To entrap dust, one spray head preferably extends into the upper portion of chamber 10 above the fluidized bed B of the gas suspended solid particles to be agglomerated.

In operation, as illustrated in the examples described below, a charge of powder to be agglomerated is placed in chamber 10, with screen 18 being of appropriate mesh to prevent the particles from falling into gas inlet duct or section 14. Air at the appropriate temperature, velocity and pressure is then introduced through conduit 16 and air inlet 14 into chamber 10 to suspend the powder above screen 18 and form the desired circulating fluidized bed B. Agglomerate fluid is then rapidly sprayed from spray head or nozzle 22 or 22' (or both nozzles) onto or into the moving bed, with the size of the orifices in the spray head or heads being such, under the spraying pressure, as to form droplets of substantially larger size than the particles being agglomerated. When the agglomerates are of the desired size, spraying is then stopped immediately and drying of the agglomerates can then be completed.

For a continuous operation of this technique, one can provide for continuous migration of the agglomerates from the agglomerating area to a drying area either through lateral flow in a fluidized bed or through downward movement in a fluidized bed counterflow to the flow of the fluidizing gas. The initial powdered material can either be fed in adjacent or concentric with the liquid application device or fed into the free space above the fluidized bed or into the bed.

In either a batch or continuous process, additional coating ingredients such as volatile flavoring ingredients, lubricants, sealants, etc. can be added just prior to removal of the dried product. The following examples will serve to illustrate the invention.

Example I

A mixture with particles of about 40–50 microns in size and containing about 65% powdered magnesium trisilicate and 35% powdered aluminum hydroxide gel is first suspended in fluidized bed form using air of about room temperature (72° F.) as the suspending medium. A thick syrup made up of about 2 parts of sucrose to 1 part of water is then sprayed at low pressure in droplet form of about 200–800 micron size on top of the fluidized bed. A spray nozzle designed to operate at atomizing pressures of 30 p.s.i.g. and above and operated at pressures of about 10–12 p.s.i.g. will provide satisfactory droplets. The syrup solution is sprayed as rapidly as possible under the pressure used. As soon as the agglomerates are of the desired size, spraying is discontinued and drying of the particles is completed using air of 200–220° F. The resulting dry porous agglomerates are free flowing and can be readily compressed into soft anti-acid tablets which are easy to chew and disintegrate rapidly in the presence of water or like aqueous media.

Example II 1000 parts of sodium bicarbonate of about 50 microns median size was suspended in a fluidized bed form using air at about 200° F. as the suspending medium. About 100 parts of a simple syrup, made up of sucrose and water in the ratio of 2 parts of sucrose to 1 part of water, was then sprayed into the fluidizing air below the fluidized bed. The spray nozzle (40–100 liquid nozzle, 180 air nozzle) was operated at an atomizing pressure of about 25 p.s.i.g. and produced droplets of from about 200–800 microns in size. Spraying was discontinued after 30 seconds but the fluidized bed was maintained with the inlet air at 200° F. for another three minutes to dry the resulting agglomerates. These agglomerates were found to be somewhat spherical in shape, readily soluble in water and to have good flow properties.

When products such as hydrates and dibasic salts which contain chemically combined solvents are dried a very interesting phenomenon occurs. While a particular form of solvent-product molecule is dissociating with the evolution of solvent vapor, the product will require a constant input of energy. Equilibrium will be established with a particular solvent vapor concentration and exhaust air temperature. If inlet air conditions are also held constant, the exhaust air temperature will remain constant until the particular chemical combination is dissociated. Thus a sharp increase in outlet air temperature over the previously constant temperature signals the completion of the drying or breakdown of one form of solvent-product bond and the initiation of the decomposition of a lower molecular weight hydrate or solvent combination. Drying can thus be controlled by operating at a predetermined temperature and the dried product removed when at an exact and desired composition. This can be very important when producing a product containing a particular form of hydrate which may have different properties than others or in the case of an effervescent product having a certain ratio of dibasic salts.

The following example is illustrative.

Example III

The chamber is charged with a finely divided powdered mixture (minus 200 microns) of the following ingredients.

| | Pounds |
|---|---|
| Aluminum hydroxide | 45.0 |
| Magnesium trisilicate | 84.5 |
| Soluble saccharin | 0.1 |
| Powdered sugar with 3% starch | 25.0 |
| Corn starch | 49.4 |

Air at a temperature of about 200–220° F. is directed into the lower end of the chamber at a rate of about 1720 cubic feet per minute. A flow of aqueous sugar solution containing 0.574 gram of sucrose per cc. of solution is then initiated through spray nozzle 22 located above the resulting circulating fluidized bed of solid powdered particles. The nozzle and pressure are adjusted to provide liquid droplets in the range of about 200–800 microns in size. About 6.48 gallons of sugar solution are sprayed in about 2.63 minutes, i.e. about 2.46 gallons per minute. The spray is then shut off and the drying of the resulting agglomerates is continued with fluidizing air at about 200° F. for about 9 minutes. During this period the exhaust air is in the range of about 90° F. for about 4 minutes. The exhaust air temperature then jumps to about 100° F. as the hydrated agglomerates lose part of their water of hydration and form a new hydrate. The exhaust air remains at this temperature (100° F.) for about 2.5 minutes when the exhaust air temperature again jumps to about 105° F. as the agglomerates lose some additional water of hydration and form another hydrate. The exhaust air remains at this temperature (105° F.) for about another 2.5 minutes, when the flow of heated air is then stopped at or about the time the exhaust air temperature again starts to rise. To obtain a satisfactory anti-acid composition, the flow of heated air, in all cases, should be stopped before the exhaust air temperature reaches 120° F.

*Example IV*

This example is in accordance with Example I, except that the solid powdered particles, which normally contain about 5% moisture, are first dried in the heated fluidizing air down to a moisture content of about 2% before starting the spraying of the liquid droplets of agglomerating sugar solution. This procedure is preferred in some operations as little, if any, special drying period is required to complete the drying of the agglomerates, after the application of the liquid adhesive binder or granulating agent. For example, where the powders to be agglomerated contain about 5% moisture, it has been found that the powders may contain about 9% moisture after the application of the aqueous sugar solution. To obtain a satisfactory product containing the original 5% moisture, continued drying is thus required to remove the 4% moisture picked up during the application of the binder. This special drying step for the most part can be avoided if the powders are dried, e.g. down to 1–2% moisture, before application of the binder. In certain cases this is of special importance, where, for example, the agglomerates tend to undergo attrition or breakup in the fluidized bed during the drying period.

In the process of the present invention it is essential that all of the solid particles be suspended in an upwardly flowing gas stream in a continuously circulating fluidized bed. It is also essential that the suspended solid particles be relatively small in size of the powder-type, e.g. 2–200 microns in size. It is also essential that the liquid droplets be substantially larger in size, e.g. 200 to 2000 microns, with a majority of the droplets being at least about 4–5 times larger than the fluidized powdered particles.

In place of sucrose other adhesive binders or granulating agents such as glucose (Corn Syrup), methylcellulose (Methocel), polyvinylpyrrolidone (PVP), acacia, tragacanth, starch and the like can be used. Where the binder is soluble in organic solvents, e.g. Methocel, PVP, etc., and an anhydrous system is desired, e.g. in agglomerating certain vitamins which tend to deteriorate in the presence of moisture, solvents such as ethanol can be used. Also, to obtain a highly porous agglomerate it has been found that at least a substantial portion, e.g. 5% by weight or above, of the solid fluidized particles should be soluble (or colloidally dispersible) in the volatile solvent in which the adhesive binder or granulating agent is dissolved. This is illustrated by both Examples II and III and is a preferred procedure. In a preferred procedure, the binder material is also made up of a viscous concentrated solution of the adhesive binder or granulating agent. As noted above, the spraying at low pressure of concentrated solutions not only readily provides for desired droplet-size but also due to the limited amount of solvent present, permits rapid spraying of the liquid with ready control of agglomerate size.

It is claimed:
1. A process for preparing agglomerates which comprises:
   (1) dissolving an adhesive binder in a volatile solvent selected from the group consisting of aqueous and non-aqueous volatile solvents, and combinations thereof;
   (2) suspending a mass of solid material in discrete particle form, said particles being from about 2 to 200 microns in size, in an upwardly flowing stream of gas;
   (3) maintaining the discrete particles in the suspended mass in a constant state of motion whereby the said particles are continuously circulating throughout the suspended mass;
   (4) introducing rapidly into the said suspended mass the solution obtained in step (1) above in liquid droplet form, the said droplets being from about 200 to about 2000 microns in size, the majority of said droplets being at least 4 to 5 times larger than the said discrete particles of solid material and thereby wetting discrete particles in the suspended mass, whereby the adherence together of the particles is promoted and agglomeration of particles is effected; and
   (5) drying the said aglomerates by means of the said upwardly flowing stream of gas while maintaining them in suspension in said stream of gas.
2. The process of claim 1 wherein a substantial proportion of the solid material in discrete particle form is soluble in the volatile solvent in which the adhesive binder is dissolved.
3. The process of claim 1 wherein the adhesive binder comprises sucrose and the volatile solvent water.
4. The process of preparing free flowing porous agglomerates adaptable for use as granules in the manufacture of compressed tablets which comprises:
   (1) dissolving two parts by weight of sucrose in one part by weight of water to form a viscous solution;
   (2) suspending a mass consisting essentially of magnesium trisilicate, aluminum hydroxide, sucrose and starch, all in discrete particle form wherein the particle size is less than 200 microns in an upwardly flowing stream of gas and maintaining the discrete particles in the suspended mass in a constant state of motion whereby the said particles are continuously circulating throughout the suspended mass;
   (3) rapidly spraying the aforesaid viscous solution in liquid droplet from into the suspended mass, the droplets being from about 200 to about 800 microns in size, and a majority of the droplets being from 4 to 5 times larger than the said discrete particles, thereby wetting discrete particles and initiating agglomeration of discrete particles, and continuing the said spraying until the formed agglomerates have reached the desired size; and
   (4) drying the formed agglomerates by means of the upwardly flowing stream of gas while maintaining the formed agglomerates in suspension in said stream of gas.
5. The process of claim 4 wherein, prior to the introduction of the droplets of adhesive binder in volatile solvent into the suspended mass of solid particles, the moisture content of the said particles is reduced to about 1 to 2% by weight by means of the upwardly flowing stream of gas while said particles are maintained in suspension in said stream of gas.

(References on following page)

References Cited by the Examiner

UNITED STATES PATENTS

| | | | |
|---|---|---|---|
| 2,457,963 | 1/49 | Thodos | 264—117 |
| 2,529,466 | 11/50 | Weldon | 264—7 |
| 2,938,233 | 5/60 | Nack et al. | 264—7 |
| 3,001,228 | 9/61 | Nack | 264—7 |
| 3,026,568 | 3/62 | Moar | 264—7 |
| 3,036,338 | 5/62 | Nack | 264—7 |
| 3,043,652 | 7/62 | Schytil | 264—117 XR |
| 3,070,837 | 1/63 | Loertscher et al. | 264—7 |

FOREIGN PATENTS

| | | |
|---|---|---|
| 567,206 | 5/58 | Belgium. |
| 1,133,389 | 3/57 | France. |

ALEXANDER H. BRODMERKEL, *Primary Examiner.*

MICHAEL V. BRINDISI, *Examiner.*